US012582097B1

(12) United States Patent
Windsor

(10) Patent No.: US 12,582,097 B1
(45) Date of Patent: Mar. 24, 2026

(54) ADJUSTABLE ANIMAL WASTE COLLECTION APPARATUS WITH INTERCHANGEABLE ATTACHMENTS

(71) Applicant: Erica F Windsor, El Paso, TX (US)

(72) Inventor: Erica F Windsor, El Paso, TX (US)

( * ) Notice: Subject to any disclaimer, the term of this patent is extended or adjusted under 35 U.S.C. 154(b) by 30 days.

(21) Appl. No.: 19/241,449

(22) Filed: Jun. 18, 2025

(51) Int. Cl.
*A01K 23/00* (2006.01)

(52) U.S. Cl.
CPC .................................. *A01K 23/005* (2013.01)

(58) Field of Classification Search
CPC ............. B65F 1/0006; B54F 2240/136; E01H 1/1206; E01H 2001/128; E01H 2001/1286; A01K 23/005
See application file for complete search history.

(56) References Cited

U.S. PATENT DOCUMENTS

| | | | | |
|---|---|---|---|---|
| 10,455,812 | B1 * | 10/2019 | Bircher | A01K 29/005 |
| 10,470,440 | B1 * | 11/2019 | Kim | A01K 23/005 |
| 10,697,142 | B1 * | 6/2020 | Jackson | A01K 29/005 |
| 10,772,300 | B1 * | 9/2020 | Hicks | A01K 29/005 |
| 2021/0120782 | A1 * | 4/2021 | Baker | A01K 23/005 |
| 2021/0298270 | A1 * | 9/2021 | Reevey | A01K 23/005 |

* cited by examiner

*Primary Examiner* — Joshua J Michener
*Assistant Examiner* — Henry Hooper Mudd

(57) ABSTRACT

An animal-waste collection apparatus includes an elongate shaft with adjustable length, a forearm-stabilising assembly at a proximal region, and a coupling assembly at a distal region. The coupling assembly provides multi-axis articulation between a first coupling element fixed to the shaft and a second coupling element borne by interchangeable attachment bodies. A first attachment body supplies a support structure defining a seat for a removable receptacle, and a second attachment body comprises opposing jaws movable between open and closed positions to retain a flexible bag. Each attachment body is interchangeably engageable with the coupling assembly through the second coupling element. The apparatus enables selective collection of liquid or solid waste while permitting ergonomic handling across varied user statures and physical abilities.

20 Claims, 8 Drawing Sheets

116

118

120

ADJUSTABLE ANIMAL WASTE
COLLECTION APPARATUS WITH
INTERCHANGEABLE ATTACHMENTS

FIELD OF INVENTION

The present disclosure relates to hand-held implements used for collecting biological waste from companion animals. More particularly, it concerns adjustable, user-supported devices equipped to gather urine and fecal samples without direct hand contact.

BACKGROUND

Companion-animal ownership imposes two frequent and distinct collection tasks upon caretakers: obtaining fresh urine specimens for veterinary diagnostics and removing solid excreta from public or private premises to meet sanitary regulations. Existing products intended to facilitate these tasks fall into two broad categories. First, various manual aids—such as shallow plastic pans, ladles, or disposable trays—are marketed for urine collection. Second, rigid "pooper-scooper" implements and the ubiquitous hand-inverted plastic bag are relied upon for stool retrieval. Despite widespread use, these approaches share persistent shortcomings that can impede compliance and compromise sample integrity.

Urine-collection aids typically require the caretaker to crouch or bend proximate to the animal while manoeuvring an open receptacle beneath the urinary stream. Once collected, liquid must be decanted into a separate specimen cup that conforms to veterinary practice, a transfer step that introduces opportunities for spillage, contamination, and mislabelling. The receptacles themselves are rarely height-adjustable, provide little positional stability, and generally assume that the operator possesses full range of motion, fine motor control, and the ability to remain at ground level throughout the procedure. Wheelchair users, individuals recovering from surgery, or persons with arthritis frequently find such implements unusable, thereby resorting to assistance or forgoing timely diagnostic sampling altogether.

Stool-collection techniques exhibit parallel limitations. The inverted-bag method obliges the user to reach the ground, grasp the waste directly, and then manipulate the bag mouth to secure the contents—a manoeuvre rendered difficult on uneven terrain or in adverse weather. Rigid scoop devices reduce hand contact but are often bulky, single-purpose, and require two-handed operation to open and close jaws. Neither solution offers controlled closure that prevents odour or leakage during subsequent transport to disposal sites. Moreover, existing scoop handles are typically of fixed length and lack ergonomic stabilisation, leading to dropped waste or incomplete pick-up, particularly when managing larger or restless animals.

Another drawback resides in the fragmented nature of available tools. Separate devices must be procured, carried, and maintained for liquid versus solid collection, increasing expense and logistical burden. Users must anticipate which tool will be needed on any given outing or veterinary visit, and must often juggle a leash, mobility aid, and the chosen implement simultaneously. The absence of a unified system capable of accommodating both collection modalities discourages consistent use and exacerbates the risk of environmental contamination or non-compliance with local ordinances.

Attempts to address these challenges have introduced articulating or swivelling heads on certain scoops, yet such mechanisms typically rely on threaded connections or complex latches that are difficult to engage single-handedly and prone to mechanical failure after repeated cleaning. Known devices generally do not provide a coupling that can be rapidly re-oriented in multiple planes to track unpredictable animal movement while maintaining sample receptacle stability. Furthermore, handle architectures borrowed from conventional walking sticks or lightweight plastics lack integrated forearm support, resulting in user fatigue and diminished control during critical moments of sample acquisition.

Consequently, a longstanding need persists for a collection aid that enables caretakers—particularly those with limited mobility or upper-limb strength—to obtain both urine and stool samples without bending, transferring liquids, or handling waste directly. Such a solution should accommodate a range of operator statures, permit one-handed operation from a standing or seated position, and provide secure temporary containment of collected material. Overcoming these deficiencies would materially improve compliance with veterinary recommendations, reduce environmental waste hazards, and enhance the overall caregiving experience for pet owners of diverse physical abilities.

It is within this context that the present invention is provided.

SUMMARY

An aspect of the present disclosure provides an animal-waste collection apparatus that includes an elongate shaft with a length-adjustment mechanism, a forearm-stabilising assembly positioned on a proximal region of the shaft, and a coupling assembly carried at a distal region of the shaft. The coupling assembly incorporates a first coupling element fixed to the shaft and a second coupling element borne by interchangeable attachment bodies, thereby enabling selective connection of a receptacle-support attachment or a jaw-type bag-retaining attachment. By interchangeably mounting either attachment body to the shaft through the coupling assembly, a single implement affords the user the ability to collect both liquid and solid animal waste samples while maintaining an ergonomic posture and stable control.

The apparatus, in its broadest form, relies upon a multi-axis coupling that permits articulation of the selected attachment body relative to the shaft, as well as a forearm-engaging stabiliser that secures the implement to the user with minimal hand effort. These structural relationships allow the implement to be manipulated from a standing or seated position, reduce the likelihood of spillage, and minimise contact between the user and the collected sample or surrounding environment.

In some embodiments the shaft comprises telescopically nested tubular members, and the length-adjustment mechanism includes indexing holes and a spring-biased detent pin. This configuration permits rapid, incremental changes in effective reach, accommodating users of varying stature or those operating from a wheelchair.

In further embodiments the forearm-stabilising assembly employs two axially spaced flexible straps, each strap having perforations that cooperate with a buckle. The dual-strap arrangement distributes load along the forearm and lessens rotational torque on the wrist, allowing prolonged use without fatigue.

In yet further embodiments each strap is mounted on a collar that is both axially slidable and rotatable about the shaft. Such adjustability enables the apparatus to be configured for either left-handed or right-handed operation and to suit a wide range of forearm circumferences.

In some embodiments the coupling assembly utilises a ferromagnetic spherical element affixed to the shaft and a complementary concave socket in each attachment body. Magnetic retention provides swift, tool-free interchange of attachments while allowing smooth omnidirectional articulation that tracks animal movement.

In further embodiments a manually operable locking collar surrounds the concave socket, permitting the user to restrict articulation after achieving a desired orientation of the selected attachment body, thereby improving positional stability during sample acquisition.

In yet further embodiments the receptacle-support attachment comprises an annular frame whose interior surface frictionally engages a removable cup. Optional inwardly projecting ribs help centre the cup, and an open bottom portion ensures unobstructed flow, simplifying post-collection handling.

In some embodiments the jaw-type attachment includes opposing jaws hinged along a spine and biased toward an open position by a torsion spring. A thumb-actuated latch may be provided to secure the jaws in a closed state, facilitating one-handed capture and retention of solid waste.

In further embodiments the jaws define a continuous peripheral groove that forms a channel for receiving the mouth of a flexible bag, and a cinch strap routed through guide openings draws the bag closed. These features confine odour and mess until disposal.

In yet further embodiments at least a portion of the shaft is formed of a fibre-reinforced polymer, providing a favourable strength-to-weight ratio while resisting corrosion and facilitating routine cleaning.

In some embodiments the proximal region of the shaft terminates in an over-moulded elastomeric grip that enhances tactile comfort and reduces slippage in wet conditions.

In further embodiments each attachment body is fabricated from materials capable of withstanding autoclave sterilisation, thereby supporting repeated clinical or professional use where stringent hygiene standards apply.

In yet further embodiments an illumination assembly disposed adjacent the coupling assembly projects light toward the attachment region, aiding accurate placement of the receptacle or bag in low-light environments such as early morning walks.

In some embodiments the coupling assembly is configured to allow at least twenty degrees of angular displacement of each attachment body in any plane, ensuring sufficient freedom of movement to accommodate unpredictable animal behaviour while maintaining receptacle orientation.

BRIEF DESCRIPTION OF THE DRAWINGS

Various embodiments of the invention are disclosed in the following detailed description and accompanying drawings.

Figure 1:
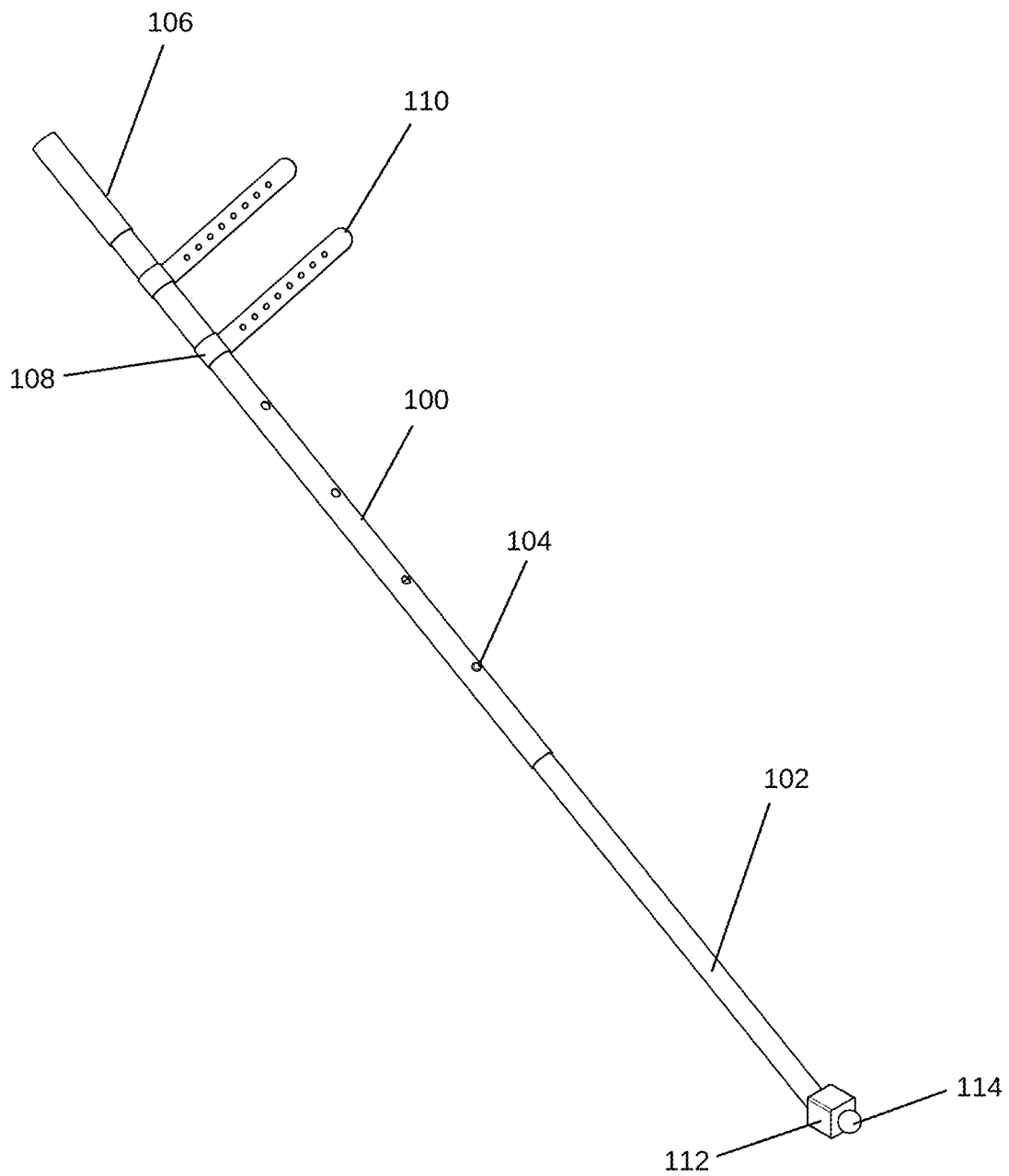
FIG. 1 illustrates an example handle sub-assembly showing the telescopic shaft, forearm straps, and distal coupling.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term "and/or" includes any combinations of one or more of the associated listed items.

As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

When a feature or element is described as being "on" or "directly on" another feature or element, there may or may not be intervening features or elements present. Similarly, when a feature or element is described as being "connected," "attached," or "coupled" to another feature or element, there may or may not be intervening features or elements present. The features and elements described with respect to one embodiment can be applied to other embodiments.

The use of spatial terms, such as "under," "below," "lower," "over," "upper," etc., is used for ease of explanation to describe the relationship between elements when the apparatus is in its proper orientation.

The terms "first," "second," and the like are used to distinguish different elements or features, but these elements or features should not be limited by these terms. A first element or feature described can be referred to as a second element or feature and vice versa without departing from the teachings of the present disclosure.

The term "shaft" refers to any elongate structural member suitable for supporting one or more user-manipulated components and may be solid, hollow, or composite. In one example implementation, the shaft may be formed from carbon-fiber-reinforced polymer tubing to reduce mass while maintaining rigidity; in another implementation, the shaft may be extruded aluminium alloy 6061-T6 hard-anodised to resist corrosion and facilitate cleaning with veterinary-grade disinfectants.

The term "length-adjustment mechanism" denotes any structure that permits selective alteration of an overall effective length of the shaft. Such a mechanism may employ telescopically nested tubes locked by detent pins, screw collars, bayonet cam locks, or spring-loaded collets. By way of example, a pair of concentric stainless-steel tubes may be indexed by a milled groove and opposing ball-detent assembly to provide stepwise adjustment in 10-millimetre increments.

The term "forearm-stabilising assembly" refers to any device, whether fixed or adjustable, that secures a proximal region of the shaft to a user's forearm. A typical implementation may include perforated thermoplastic elastomer straps moulded from styrene-ethylene-butadiene-styrene (SEBS) secured by acetal double-post buckles, though hook-and-loop textile straps or inflatable cuffs are also contemplated.

The term "coupling assembly" designates a joint or interface at the distal region of the shaft that releasably connects interchangeable components while allowing relative articulation. One non-limiting example is a 25-millimetre low-carbon-steel sphere plated with hard chrome in magnetic engagement with a socket containing neodymium-iron-boron (NdFeB) ring magnets; alternative couplings may employ keyed bayonet fittings, quick-release pins, or kinematic three-ball mounts.

The term "attachment body" encompasses any modular component adapted for selective engagement with the coupling assembly and configured to perform a specific collection function. The attachment body may be injection-moulded polypropylene in a disposable format or precision-machined polyetheretherketone (PEEK) for repeated autoclave sterilisation.

The term "receptacle" refers to any container suitable for receiving liquid biological samples and may include, without limitation, standard 90-millilitre polypropylene specimen cups, glass vials with screw-thread necks, or single-use polyethylene pouches pre-dosed with stabilising reagents such as boric acid. Example solvents used for subsequent cleaning of the receptacle-support attachment include 70% isopropanol or alkaline detergents approved under EN 1040 biocidal standards.

The term "jaw" denotes a rigid or semi-rigid member that cooperates with an opposing member to define an aperture capable of capturing and retaining a flexible bag. Jaws may be ABS shells hinged on a stainless-steel pin, spring-biased by phosphor-bronze torsion coils, although living-hinge polypropylene or glass-filled nylon constructions are likewise suitable. The phrase "flexible bag" encompasses any pliant container formed from film or sheet material, including low-density polyethylene, biodegradable polylactic acid blends, or laminated barrier films incorporating odour-adsorptive activated-carbon layers.

The term "ferromagnetic" describes materials exhibiting spontaneous magnetisation, such as low-carbon steels, high-permeability alloys like 80-permalloy, or soft magnetic composites produced by pressing iron-silicon powder in phenolic binders. These materials may receive protective coatings-zinc-nickel plating, Parylene-C deposition, or epoxy-powder coating—to enhance wear and chemical resistance during routine sanitisation with quaternary-ammonium compounds.

The term "elastomeric," when applied to grips or straps, signifies polymers that recover substantial deformation upon load removal, including thermoplastic polyurethane (TPU), silicone rubber (VMQ), or natural rubber latex free of Type I allergens. Elastomeric components may be over-moulded onto metallic or polymeric substrates by insert-moulding processes to achieve hermetic bonds and eliminate moisture ingress paths.

The phrase "multi-axis articulation" indicates relative movement between coupled elements about at least two orthogonal axes, whether by spherical joints, compliant flexures, or universal joints employing intersecting hinge pins. In an exemplary articulation, a spherical-socket interface affords continuous rotation of +20 degrees in any plane while maintaining magnetic retention of no less than 6 kilograms force.

Unless otherwise indicated, reference to "materials capable of withstanding autoclave sterilisation" means polymers or metals stable at 134° C. saturated steam for a minimum of three minutes without exceeding 1% dimensional change or exhibiting surface crazing, as verified under ISO 17665-1 protocols.

DESCRIPTION OF DRAWINGS

The following detailed description is presented to enable any person skilled in the art to make and use the claimed apparatus. Various modifications to the embodiments described herein will be readily apparent, and the generic principles defined may be applied to other embodiments and applications without departing from the scope of the invention. Accordingly, the description is to be regarded as illustrative rather than restrictive.

Broadly stated, the invention provides an animal-waste collection apparatus that combines an elongate, length-adjustable shaft, a forearm-stabilising assembly, and a distal coupling assembly capable of interchangeably supporting either a receptacle-holding attachment or a jaw-type bag-retaining attachment. By furnishing both liquid-sample and solid-waste capabilities in a single implement, the apparatus overcomes the fragmentary nature of conventional tools that require separate devices for urine and stool collection. The length-adjustable shaft enables users of different stature, including those seated in a wheelchair, to position the selected attachment beneath a companion animal without bending or squatting, thereby addressing the ergonomic deficiencies of prior art pans, ladles, and scoops.

The multi-axis coupling assembly permits smooth articulation of the attachment body relative to the shaft, allowing the receptacle or bag to track unpredictable animal movement without complex manual re-alignment. Unlike threaded joints or rigid scoops that can bind or fail after repeated cleaning, the present coupling can be engaged and disengaged quickly, often with a single hand, while maintaining robust retention during use. The forearm-stabilising assembly secures the proximal region of the shaft to the user, reducing wrist torque and enhancing overall positional control. This feature remedies the instability and fatigue associated with handles that rely solely on a manual grip.

Further benefits flow from the structural integration of the receptacle-support and jaw-style attachments. The former can accept a standard specimen cup, eliminating liquid transfer steps that introduce contamination or spillage, while the latter employs opposing jaws to capture a flexible bag and, in some embodiments, cinch and latch mechanisms to contain odour and leakage during transit. Together these improvements promote more reliable sample acquisition, discourage environmental contamination, and reduce the physical effort required of caretakers—including those with limited mobility—thereby addressing the persistent shortcomings identified in the background section.

Reference will now be made to illustrative embodiments, examples of which are shown in the accompanying drawings. Wherever practicable, the same reference numerals will be used throughout the drawings to refer to the same or like parts.

FIG. 1 illustrates a perspective view of a handle subassembly that constitutes the proximal portion of the apparatus. An outer tubular member 100 houses a telescoping inner tube 102, the relative position of which is selected by a series of detent apertures 104 that cooperate with a spring-biased pin (not visible in this view) to establish incremental length settings. Although the tube pair is shown as circular in cross-section and fabricated from anodised aluminium, either or both tubes may be polygonal, elliptical, or multi-lobed and may instead be formed from carbon-fibre composite, glass-filled nylon, or stainless steel, depending upon weight, stiffness, or sterilisation requirements. A proximal grip 106 of over-moulded thermoplastic elastomer provides tactile comfort; in alternative examples it may be a knurled aluminium sleeve, a foam over-grip, or a removable silicone sheath.

Two collar mounts 108 support flexible forearm straps 110 that encircle a user's arm to stabilise the implement. The straps 110 are illustrated as perforated elastomeric bands engaging double-post buckles, yet hook-and-loop textile straps, ratcheting bands, or inflatable cuffs may also be employed. The distal terminus carries a coupling housing 112 from which projects a magnetic ball element 114. The ball 114 is shown as solid chrome-plated steel approximately twenty-five millimetres in diameter; other diameters or hollow spheres of titanium, ferritic stainless steel, or powdered-iron composite may be substituted to tune magnetic pull force or weight.

Figure 2:
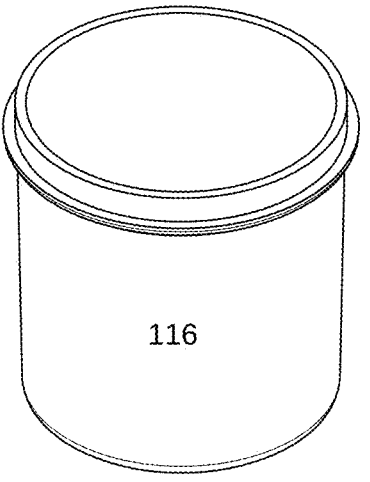
FIG. 2 illustrates an example liquid-sample attachment alongside a standard specimen cup.
Figure 2:
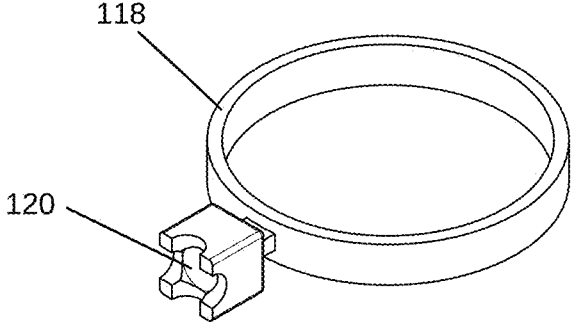

FIG. 2 shows the liquid-sample collection components separate from the shaft. A removable specimen cup 116 is illustrated as a standard ninety-millilitre polypropylene veterinary container with a threaded lid; however, glass vials, HDPE tubes, or sachets pre-charged with stabilising reagents may be used when compatible with clinical protocols.

An annular support frame 118 constitutes a first attachment body that carries, on one flank, a concave magnetic socket module 120 sized to magnetically mate with the ball 114. The frame 118 defines a seat dimensioned to friction-fit the cup 116, and inwardly projecting ribs or compliant fins (not visible externally) may be incorporated to centre receptacles whose diameters vary within manufacturing tolerance. The frame may be moulded from acetal, PEEK, or disposable polypropylene; in variants it may include drainage apertures, integral temperature indicators, or sensors for pH or specific gravity.

Figure 3:
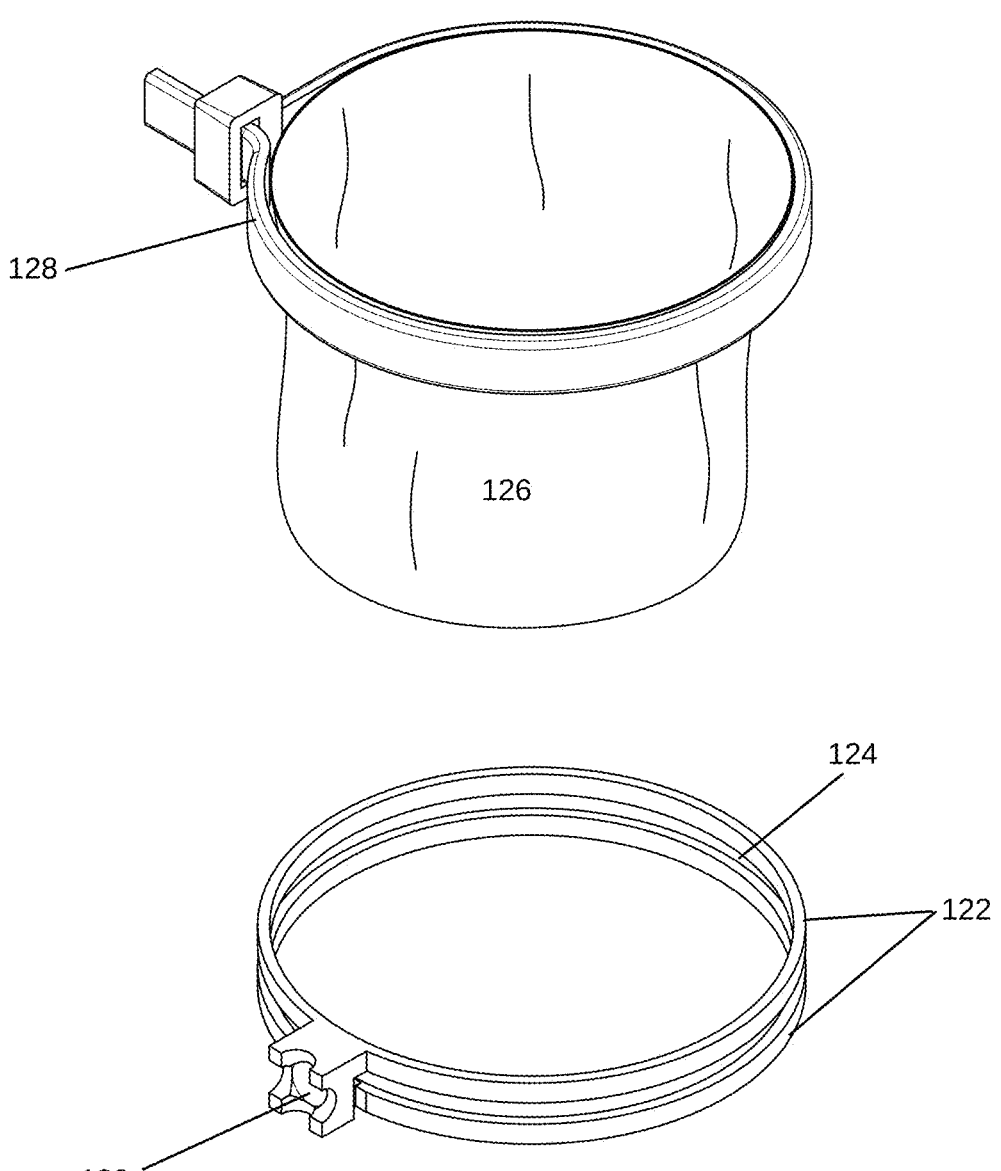
FIG. 3 illustrates an example solid-waste attachment depicted with and without a flexible bag.

FIG. 3 depicts a second attachment body configured for solid-waste collection. Opposing jaw members 122 are hinged along a rear spine and cooperate to form a peripheral bag-channel groove 124 that receives a flexible waste bag 126. The jaw members are shown as concentric ABS shells biased apart by an internal torsion spring, yet living-hinge polypropylene or glass-filled nylon jaws biased by elastomeric memory bands may equivalently be used. A cinch strap 128 passes through aligned guide holes near the jaw tips and may include a one-way stop collar or ratchet buckle (not shown) to retain the strap after tightening. The concave socket 120, identical in footprint to that of frame 118, magnetically couples the jaw assembly to the ball 114. Surface texturing on the jaw interiors, disposable liners, or antimicrobial coatings may be provided to reduce fouling. In further embodiments a thumb-actuated latch may lock the jaws shut, and an over-centre cam or spring detent could be substituted for strap 128 when rapid bag closure is preferred.

Figure 4:
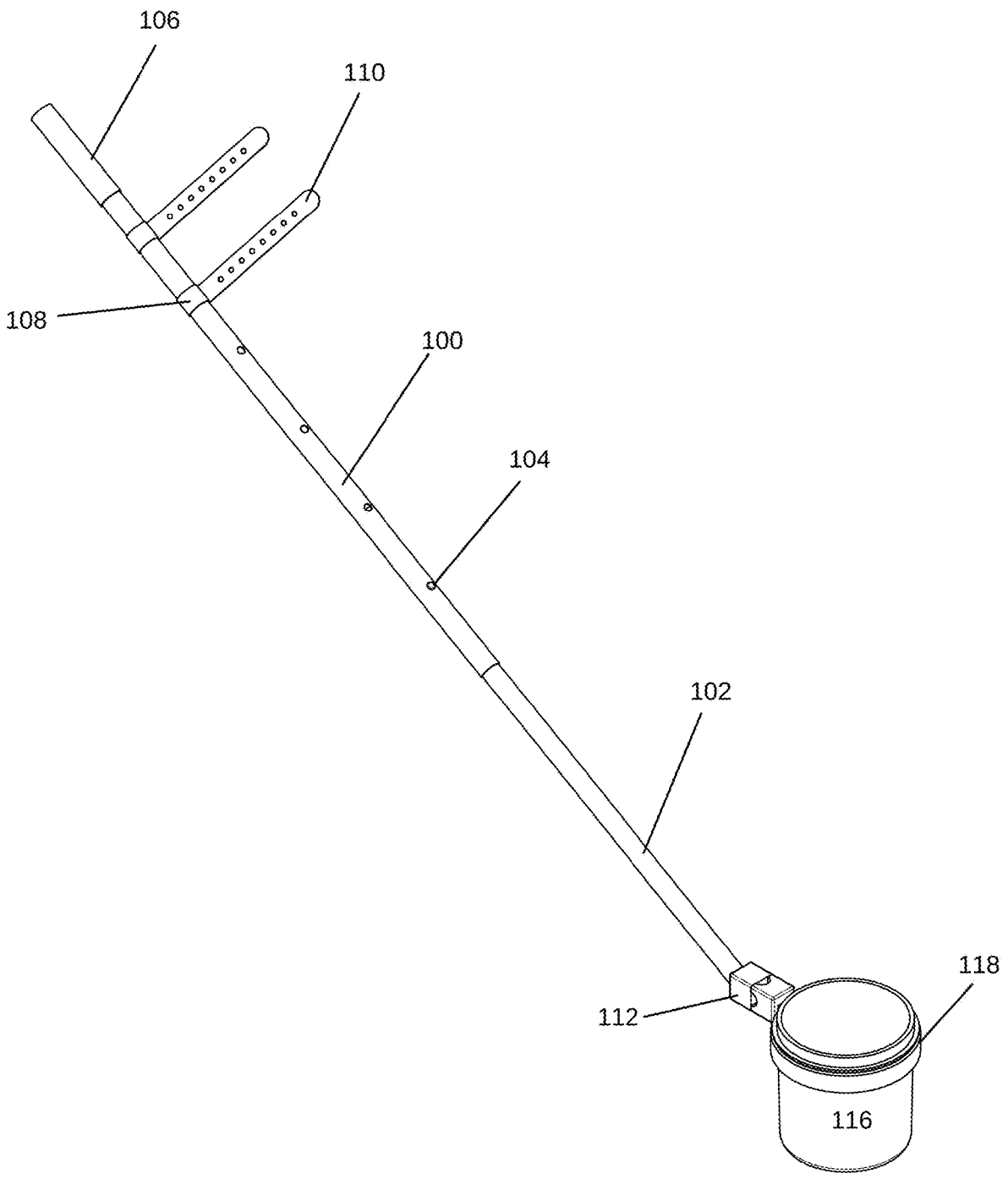
FIG. 4 illustrates an example fully assembled apparatus carrying the liquid-sample attachment and specimen cup.

FIG. 4 presents the fully assembled apparatus with the specimen cup 116 installed in the annular frame 118 and the frame magnetically engaged with the ball 114. The frame 118 is shown centred, but because the ball-and-socket interface affords multi-axis articulation of at least twenty degrees in any plane, the frame can tilt automatically to maintain the cup mouth horizontal while the handle orientation changes. In this version the In some variants a locking collar partially surrounding the socket 120 may be rotated to clamp against the ball 114 and prevent further articulation once a desired alignment is achieved. An optional LED ring secured to the collar or housing 112 may illuminate the receptacle region to facilitate night-time sampling.

Figure 5:
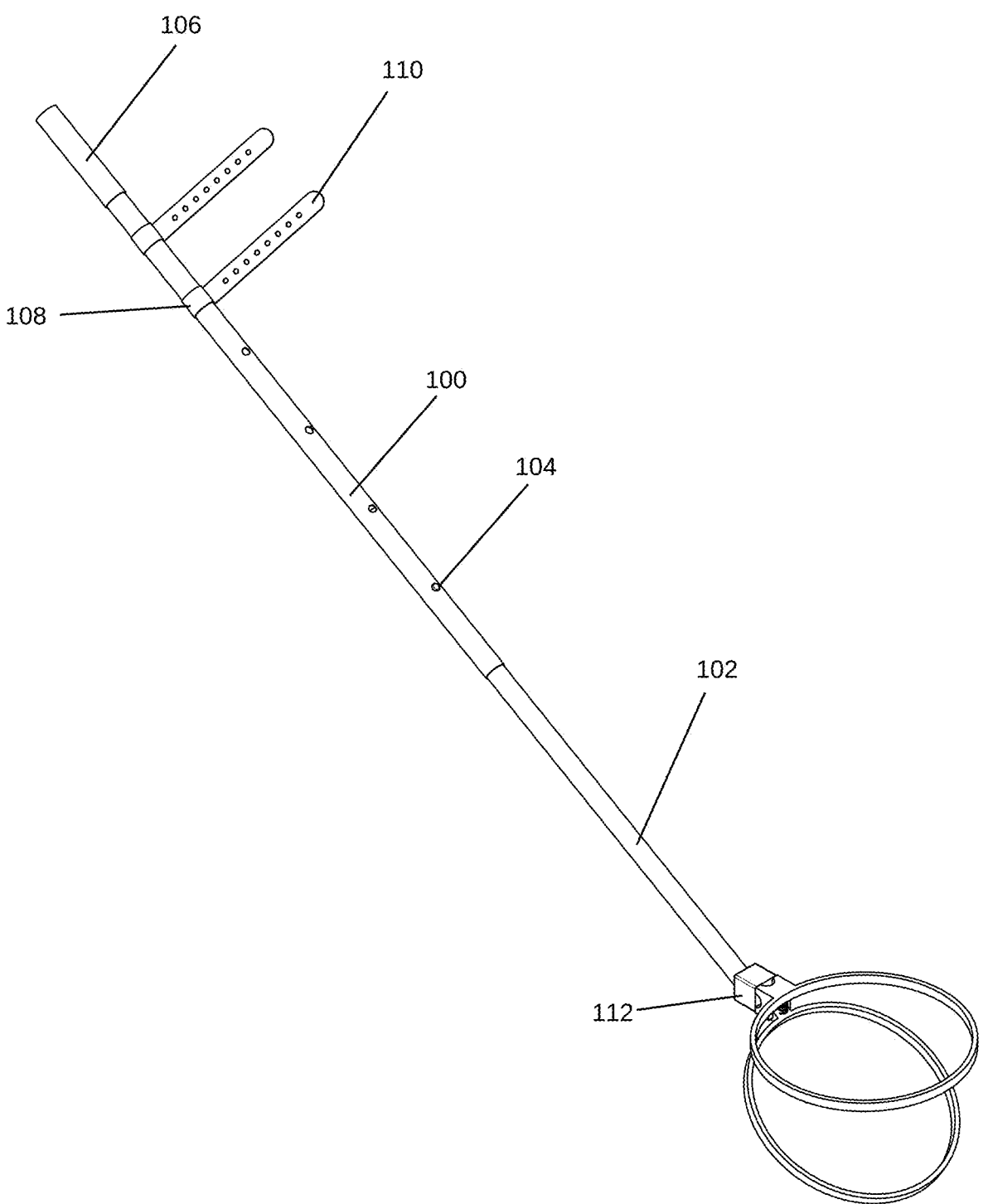
FIG. 5 illustrates an example assembled apparatus with the liquid-sample attachment in an open state and no cup installed.
Figure 6:
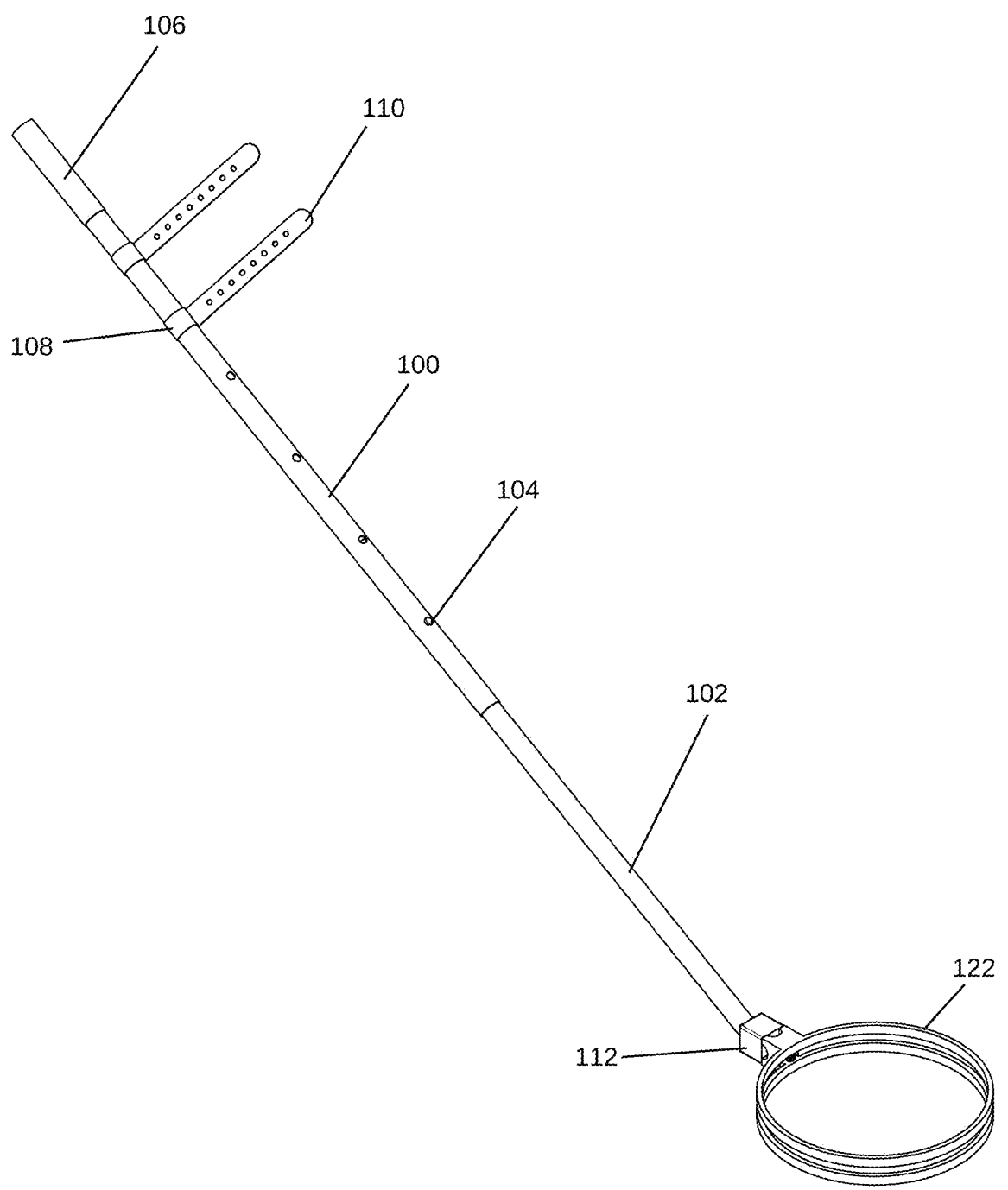
FIG. 6 illustrates an example assembled apparatus with the liquid-sample attachment in a closed state and no cup installed.

FIG. 5 shows the apparatus with the specimen cup attachment replaced by the jaws 122 attachment in an open configuration ready to receive a bag 126. The socket 120 remains accessible for quick release from the magnetic ball 114, allowing one-handed interchange with the bag-clamp attachment of FIG. 3. FIG. 6 shows the same apparatus as FIG. 5 but with the jaws 122 depicted in a closed configuration.

Figure 7:
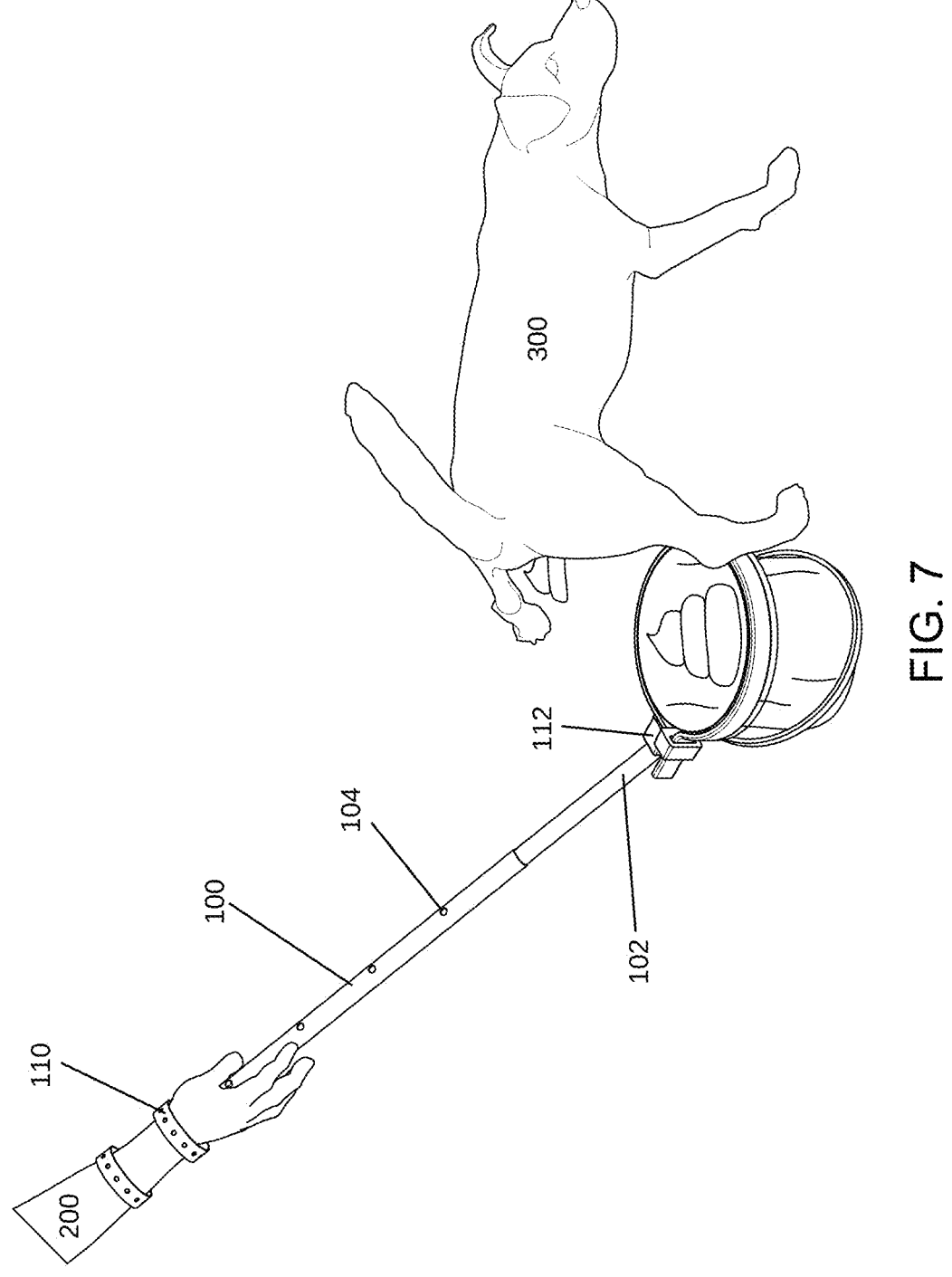
FIG. 7 illustrates an example apparatus strapped to a user's arm while collecting a stool sample from a dog.

FIG. 7 illustrates the apparatus in situ, strapped to a user's forearm 200 while supporting the specimen cup 116 beneath a defecating dog 300. The handle angle is adjusted such that the user maintains an upright posture, demonstrating how the telescopic tube 102 allows extension or retraction to suit the reach required. The articulation at the ball-and-socket interface enables the cup to remain directly beneath the animal despite minor lateral movement, reducing the likelihood of spillage. Although FIG. 7 depicts the frame attachment, the bag-clamp attachment shown in FIG. 3 may be substituted without structural modification to the handle.

Figure 8:
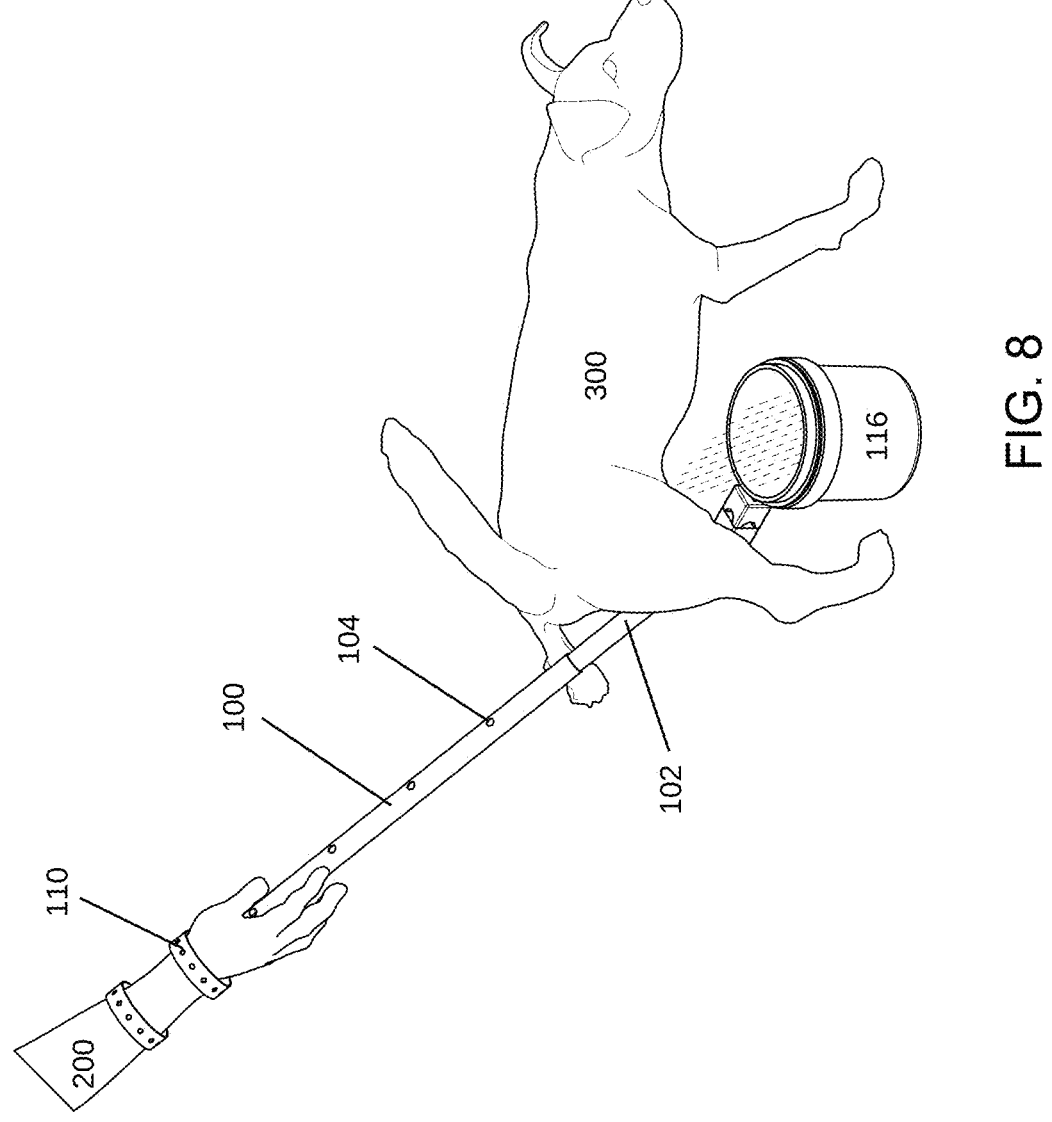
FIG. 8 illustrates an example apparatus strapped to a user's arm while collecting a urine sample from a dog.

FIG. 8 shows a similar arrangement to FIG. 7, but with the apparatus positioned to collect a urine stream from the dog 300.

In alternative embodiments the coupling housing 112 may include a quick-disconnect bayonet rather than a magnetic interface, the forearm straps 110 may be replaced with a rigid cuff articulated by a rotary joint, or the shaft tubes 100, 102 may incorporate an internal torsion spring to damp sudden rotational loads imparted by an uncooperative animal. Likewise, while dogs are shown as exemplary companion animals, the implement is equally applicable for cats, rabbits, or other small mammals, provided the receptacle size and handle length are adjusted accordingly.

Through the sequence of FIGS. 1-8, the drawings collectively demonstrate the structure and operation of an adjustable, forearm-stabilised animal-waste collection device featuring interchangeable attachments for liquid and solid samples. The illustrated embodiments are exemplary and not limiting; variations such as disposable single-use attachments, alternative magnetic grades, antimicrobial shaft coatings, or non-magnetic kinematic couplings may be adopted while remaining within the inventive concept defined by the appended claims.

CONCLUSION

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the animal waste collection apparatus of the invention have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An animal waste collection apparatus comprising:
   (a) an elongate shaft having a proximal region and a distal region;
   (b) a length-adjustment mechanism operatively associated with the shaft and configured to permit selective variation of an overall effective length of the shaft;
   (c) a forearm-stabilising assembly fixed to the proximal region of the shaft and including at least one flexible strap sized to encircle a user's forearm;
   (d) a coupling assembly disposed at the distal region of the shaft, the coupling assembly comprising a first coupling element carried by the shaft and configured for multi-axis articulation, and a second coupling element configured for releasable engagement with the first coupling element;
   (e) a first interchangeable attachment body removably mountable to the coupling assembly, the first attachment body including a support structure defining a seat dimensioned to receive and retain a removable receptacle; and
   (f) a second interchangeable attachment body removably mountable to the coupling assembly, the second attachment body including at least two opposing jaws moveable between an open position defining an aperture sized to receive a flexible bag and a closed position retaining the flexible bag within the jaws;
   wherein the first and second interchangeable attachment bodies each contain the second coupling element and are interchangeably engageable with the first coupling element of the coupling assembly.

2. The apparatus of claim 1, wherein the shaft comprises telescopically nested tubular members, and the length-adjustment mechanism includes a plurality of radial holes in a first one of the tubular members and a spring-biased detent pin carried by a second one of the tubular members, the detent pin being selectively receivable in the radial holes.

3. The apparatus of claim 2, wherein the radial holes are spaced at substantially uniform intervals along an axis of the first tubular member to provide incremental adjustment of the overall effective length of the shaft.

4. The apparatus of claim 1, wherein the forearm-stabilising assembly includes two axially spaced flexible straps, each strap having a series of perforations and a double-post buckle configured to releasably secure the strap around the user's forearm.

5. The apparatus of claim 4, wherein each flexible strap is mounted on a collar that is axially adjustable along the shaft and rotatable about the shaft.

6. The apparatus of claim 1, wherein the coupling assembly further comprises a spherical element fixed to the distal region of the shaft and defining the first coupling element, the spherical element being formed of a ferromagnetic material.

7. The apparatus of claim 6, wherein the second coupling element includes a concave socket complementary to the spherical element and containing at least one permanent magnet configured to magnetically retain the spherical element while permitting relative rotation.

8. The apparatus of claim 6, wherein the coupling assembly further comprises a manually operable locking collar surrounding the concave socket and moveable between an unlocked position permitting articulation of the spherical element and a locked position restricting articulation of the spherical element.

9. The apparatus of claim 1, wherein the support structure of the first attachment body is an annular frame including an interior surface dimensioned to frictionally engage an exterior surface of the removable receptacle.

10. The apparatus of claim 9, wherein the annular frame includes a plurality of inwardly projecting ribs configured to centre the removable receptacle within the seat.

11. The apparatus of claim 9, wherein the annular frame defines an open bottom portion allowing unobstructed passage through the seat.

12. The apparatus of claim 1, wherein the opposing jaws of the second attachment body are hinged to one another along a spine and biased toward the open position by a torsion spring.

13. The apparatus of claim 12, wherein the second attachment body further comprises a user-actuated latch configured to releasably retain the jaws in the closed position.

14. The apparatus of claim 12, wherein the opposing jaws define a continuous peripheral groove forming a bag channel sized to receive a mouth portion of the flexible bag.

15. The apparatus of claim 14, wherein the second attachment body further comprises a flexible cinch strap routed through aligned guide openings in the opposing jaws and including a stop element configured to limit reverse travel of the cinch strap.

16. The apparatus of claim 1, wherein at least a portion of the shaft is formed of a fibre-reinforced polymer.

17. The apparatus of claim 1, wherein the proximal region of the shaft terminates in an over-moulded grip formed of an elastomeric material.

18. The apparatus of claim 1, wherein each of the first and second interchangeable attachment bodies is formed of a material capable of withstanding autoclave sterilisation.

19. The apparatus of claim 1, further comprising an illumination assembly disposed proximate the coupling assembly and configured to project light toward the first or second interchangeable attachment body.

20. The apparatus of claim 1, wherein the coupling assembly is configured to permit at least twenty degrees of angular displacement of each interchangeable attachment body relative to the shaft in any plane.

* * * * *